Dec. 23, 1969  J. H. LAMB  3,484,908

SAFETY BELT COVER

Filed April 4, 1968

INVENTOR
JOHN H. LAMB
BY Thomas J. Nikolai
ATTORNEY

United States Patent Office 3,484,908
Patented Dec. 23, 1969

3,484,908
SAFETY BELT COVER
John H. Lamb, 1617 Maryland Ave. S.,
Minneapolis, Minn. 55426
Filed Apr. 4, 1968, Ser. No. 718,720
Int. Cl. A44b 19/00
U.S. Cl. 24—230
7 Claims

ABSTRACT OF THE DISCLOSURE

The invention concerns a cover member for use with a safety belt of the type having a quick release lever which when lifted outwardly from the body serves to separate the male insert from locked engagement in the female receptacle. The cover member is designed to slidably engage and surround the female receptacle so that when it is in position, it is impossible to accidentally operate the quick release lever.

BACKGROUND OF THE INVENTION

This invention relates generally to safety belts and specifically to the design of a cover member for slidably engaging a quick release type buckle on such belts to prevent the accidental or inadvertent release of the belt. Safety belts and harnesses of various designs are widely used in many applications where there is a danger to life from falling, automobile accidents, airplane accidents etc. For example, telephone linemen, power company trouble shooters and the like are often suspended at great heights by such belts and harnesses so that their hands are free to do work. With the types of quick release safety belt buckles in current use, there is a danger that the release lever could accidentally or inadvertently be operated and cause serious injury or death. The present invention provides a device for use with such safety belts to absolutely prevent the unintentional release of the belt.

BRIEF SUMMARY OF INVENTION

In its simplest form, this invention comprises a molded plastic band adapted to slide over and surround the buckle after the male latch plate is inserted into and engaged by the female receptacle. The band serves to prohibit the quick release lever from being moved outwardly until the band is intentionally moved out of operative relationship with respect to the female receptacle. The more refined configuration of a cover constitutes a box-like structure molded or otherwise formed from a semi-rigid material having one end open to accommodate the safety belt buckle and the other end closed to prevent the cover from being slid past the buckle. A slot is provided in the closed end to permit the webbing of the belt to pass therethrough. Near the open end is located a suitable detent which resists any accidental force tending to remove the cover once it is positioned over the buckle.

Various other characteristics of the invention will moreover be revealed by the following detailed description.

One form of embodiment of the invention is shown by way of example in the attached drawings, in which.

Figure 2:
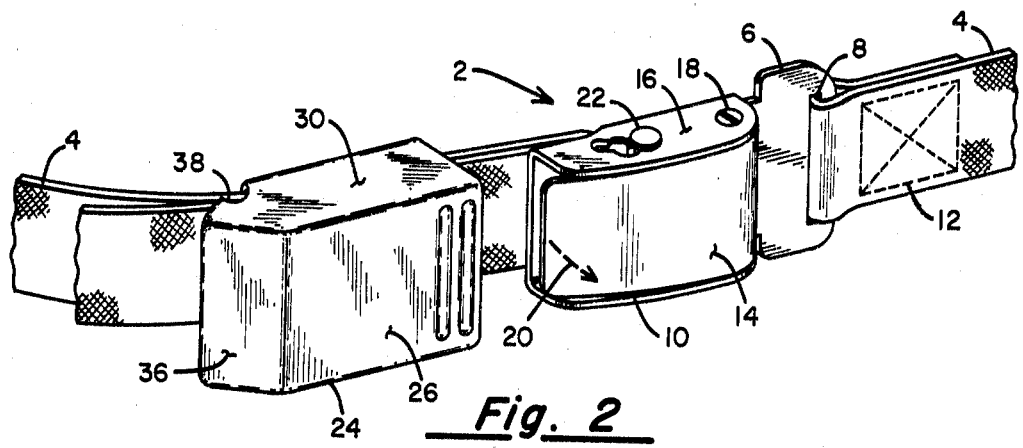
FIG. 2 is a perspective view of the cover disengaged from the buckle.

Referring first to FIG. 2, there is shown a belt or harness indicated generally at 2 which includes a woven web 4 of a suitable material such as nylon. A male latch plate 6 having a slot 8 therein forms one-half of a quick release type buckle having a femal receptacle 10. The web 4 passes through slot 8 and is folded back upon itself and stitched at 12 to firmly secure the latch plate 6 to the web 4.

The female receptacle 10 includes a release lever 14 which is pivotally mounted in a channel member 16 by a post 18 which passes through the channel 16. Associated with the release lever 14 are a pair of projections (not shown) which are designed to pass through corresponding apertures (not shown) in the latch plate 6 when the latch plate is inserted into the female receptacle 10. These projections continue on through a corresponding pair of apertures (not shown) in the bottom of channel 16. When the release lever 14 is moved in the direction indicated by arrow 20, the projections are lifted out of engagement with the apertures in the latch plate 6 to permit the separation of the two halves.

The other end of web 4 passes through a slot (not shown) in the bottom of the channel 16 around a knurled post 22 and back out through the same slot through which it entered. This configuration permits the belt to be adjusted to suit the wearer.

Figure 1:
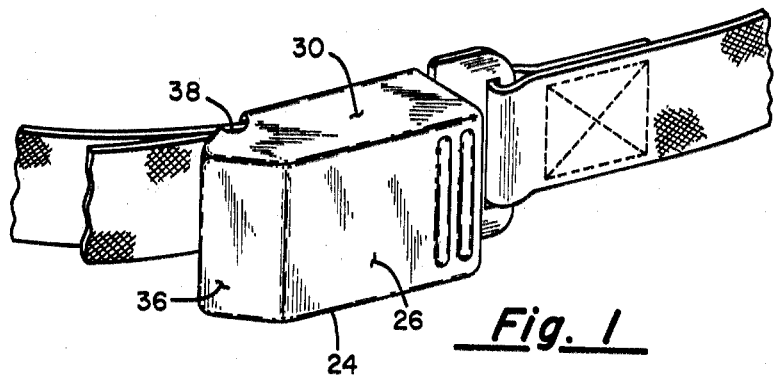
FIG. 1 is a perspective view of the safety belt with the protective cover of this invention in operating relationship with the quick-release buckle.
Figure 3:
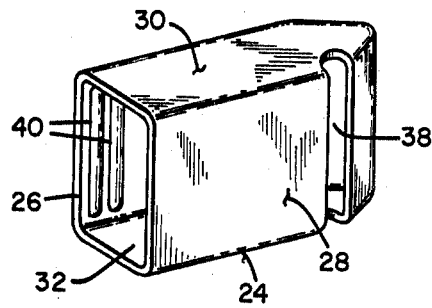
FIG. 3 is a perspective view of the cover which shows various features not visible in FIGS. 1 and 2.

The present invention is designed to cooperate with the type of safety belt and buckle just described, but it should be understood that it will work also with other configurations of quick-release buckles such as the types disclosed in U.S. Patent 3,127,650. As is illustrated in FIGURE 3, the cover 24 of this invention is generally rectangular in shape, having an integrally formed front face 26, a rear face 28, a top face 30 and a bottom face 32, defining a rectangular cylinder. The right end of the cover member is open whereas the left end (FIGS. 1 and 2) is closed by a tapering portion 36 extending at an obtuse angle with respect to the front face, which is designed to conform closely to the taper of the channel 16 of the female receptacle 10. The cover is provided with a slot 38 which is located near the left end (FIGS. 1 and 2) of the cover. The exact location is determined by the location of the aforementioned slot (not shown) in the bottom of channel 16 so that when the cover is in operative relationship with the buckle as shown in FIGURE 1, the slot 38 is substantially aligned with the slot (not shown) in the bottom of channel 16.

Another feature of the cover member of this invention is the detents 40 formed in the front face 26. Because the cover 24 is designed to substantially conform to the overall shape of the female receptacle 10, when the cover is slid into position, the detents drop behind the rightmost edge (FIGURE 2) of the buckle, tending to hold the cover in position and increase the force required to slide the cover member from the position shown in FIG. 1 to the position illustrated in FIG. 2.

It is readily apparent from the drawings and proceeding description that when the safety belt buckle cover of this invention is in place, it is impossible to lift the release lever 14. Hence, it cannot accidentally be snapped and unintentionally opened.

The cover member 24 is preferably formed by molding polyvinyl chloride or other suitable plastic by conventional processes. Alternatively, the cover member can be extruded metal and limitation to any particular material is not intended.

While the general form of the invention is shown in the drawings, and described in the specifications, it is not desired to limit this application for patent to this particular form, as it is appreciated that other forms of construction could be made that would use the same principles and come within the scope of the invention.

What is claimed is:

1. A safety belt buckle cover comprising front and rear faces;

a top and a bottom face integrally molded with said front and rear faces to form a hollow rectangular cylinder;

an end face integrally formed with said front face and extending toward said rear face at an obtuse angle; and a slot formed in said rear face extending from said top face to said bottom face.

2. A safety belt buckle cover as in claim 1 wherein said front, rear, top, bottom and end faces are integrally molded from a semi-rigid plastic material.

3. The invention as in claim 1 wherein said semi-rigid plastic material is polyvinyl chloride.

4. The article of claim 1 and further including an inward depression in said front face located in proximity to the end of said rectangular cylinder opposite to said end face and extending between said top and bottom faces.

5. A safety belt buckle cover for preventing accidental release of an associated releasable safety-belt buckle, comprising:

a front face member and a rear face member, each having upper and lower extremities and first and second ends;

top and bottom face members integrally coupled intermediate to said upper and lower extremities respectively, the arrangement defining an opening at said first end of a size capable of slidably receiving an associated safety belt buckle;

an angulated end member integrally formed with said second end of said front face member and extending at a predetermined angle toward said rear face member and said angulated member further integrally formed with said second end of said rear face member for forming a safety-belt buckle limiting closure;

a belt receiving slot formed in said rear face member for slidably receiving an associated safety belt, the arrangement being such that said front and rear face members can engage an associated safety belt buckle for preventing unintentional release thereof.

6. The apparatus as in claim 5 wherein said front face of said safety belt buckle cover has a detent formed near said first and end for releasably clamping said buckle when said cover engages said buckle.

7. In combination; a safety belt of the type having a webbed member fixedly secured to a male latch plate and adjustably secured to a quick-release buckle member; and a buckle cover comprising a hollow rectangular cylinder of semi-rigid plastic material molded to substantially conform to the outside dimensions of said quick-release type buckle, said cover including a slot in one surface thereof for receiving said webbed member.

References Cited

UNITED STATES PATENTS 3,285,659 11/1966 Robbins _____ 297—385
3,318,634 5/1967 Nicholas _____ 297—385 X

FOREIGN PATENTS 960,788 6/1964 Great Britain.

BERNARD A. GELAK, Primary Examiner

U.S. Cl. X.R.

24—77